(12) United States Patent
Esashi et al.

(10) Patent No.: US 6,938,489 B2
(45) Date of Patent: Sep. 6, 2005

(54) OSCILLATORY TYPE PRESSURE SENSOR

(75) Inventors: Masayoshi Esashi, 11-9,
Yagiyamaminami 1-Chome, Taihaku-ku,
Sendai-shi, Miyagi (JP), 982-0807;
Kaoru Hirata, Osaka (JP)

(73) Assignees: Fujikin Incorporated, Osaka (JP);
Masayoshi Esashi, Miyagi (JP)

( * ) Notice: Subject to any disclaimer, the term of this patent is extended or adjusted under 35 U.S.C. 154(b) by 12 days.

(21) Appl. No.: 10/486,331

(22) PCT Filed: Jan. 20, 2003

(86) PCT No.: PCT/JP03/00442

§ 371 (c)(1),
(2), (4) Date: Feb. 10, 2004

(87) PCT Pub. No.: WO03/062778

PCT Pub. Date: Jul. 31, 2003

(65) Prior Publication Data

US 2004/0231424 A1 Nov. 25, 2004

(30) Foreign Application Priority Data

Jan. 21, 2002 (JP) ........................................ 2002-011528

(51) Int. Cl.[7] .............................................. G01L 11/00
(52) U.S. Cl. ....................................................... 73/704
(58) Field of Search .......................... 73/702, 703, 704,
73/705; 250/559.01, 559.12, 231.19

(56) References Cited

U.S. PATENT DOCUMENTS 5,188,983 A * 2/1993 Guckel et al. ................ 438/53

FOREIGN PATENT DOCUMENTS

| JP | 56-122925 | 9/1981 |
|---|---|---|
| JP | 7-6852 | 1/1995 |
| JP | 2001-510570 | 7/2001 |
| JP | 2002-267558 | 9/2002 |

OTHER PUBLICATIONS

International Search Report for PCT/JP03/00442.

* cited by examiner

*Primary Examiner*—William Oen
(74) *Attorney, Agent, or Firm*—Griffin & Szipl, P.C.

(57) ABSTRACT

A high-sensitive and high accuracy vibrating type pressure sensor (1) allowing a corrosive gas pressure to be directly applied thereto, having a heat resistance, and having no room for mixing of noise into a vibrator, comprising a stainless steel pressure receiving diaphragm (4) for receiving a fluid pressure P on a rear surface side, the vibrator (12) formed on the front surface side of the pressure receiving diaphragm (4), a wall body (8) disposed so as to surround the periphery of the vibrator (12), and a permeable part (20) for light transmission for changing an internal space in which the vibrator (12) is present into a vacuum chamber (10) by closing an opening part (8a) in the wall body (8), whereby, since the diaphragm (4) is formed of the stainless steel with corrosion resistance, the sensor can also be applied to corrosive fluid, since circuit wiring is eliminated from the vibrator (12) and the vibrator is isolatedly disposed in the vacuum chamber (10), mixing of electromagnetic noise can be eliminated, and since the resonance frequency fn of the vibrator (12) is performed by optical measurement in the state of non-contact, extremely high-sensitive and high-accuracy detection can be performed. A forced vibration device (57) can also be operated by piezo driving and electrostatic driving from the outside without generating noise.

14 Claims, 8 Drawing Sheets

F I G. 1 2 f : Frequency (kHz)

OSCILLATORY TYPE PRESSURE SENSOR

This is a National Phase Application in the United States of International Patent Application No. PCT0JP03/00442 filed Jan. 20, 2003, which claims priority on Japanese Patent Application No. 2002-011528, filed Jan. 21, 2002. The entire disclosures of the above patent applications are hereby incorporated by reference.

FIELD OF THE INVENTION

The present invention relates principally to an oscillatory pressure sensor for use in semiconductor manufacturing facilities or chemical plants and the like, and relates more particularly to an oscillatory pressure sensor that generates no electrical noise, has high sensitivity and accuracy, and is heat resistant and suitable for use with corrosive fluids.

BACKGROUND TO THE INVENTION

It is common practice in semiconductor manufacturing facilities and chemical plants to supply a plurality of gaseous raw materials at prescribed flow rates for chemical reaction in a reaction furnace to produce high purity target gases or reactants. The pressure of the gaseous raw materials is detected and regulated, and the gas flow rate is controlled automatically at a predetermined value. The gas pressure needs to be detected with great accuracy in order to regulate the gas flow rate with high precision.

A pressure transducer is normally employed to measure gas pressure, but where a highly accurate measurement is needed, an oscillatory pressure sensor is employed.

Amongst the oscillatory pressure sensors known in the art is a silicon-semiconductor oscillatory pressure sensor disclosed by Japanese patent publication Hei 4-68574.

Said silicon-semiconductor oscillatory pressure sensor is made as follows: a silicon substrate is used as a gas pressure detecting diaphragm, an H-shaped oscillator is embedded in the silicon substrate by means of the semiconductor planar technique, and the oscillator-embedded silicon substrate is then encased in a semiconductor-made capsule, the interior of which capsule is evacuated. The semiconductor planar technique allows the oscillatory pressure sensor to be made extremely small. When used for measuring pressure in the micro-size field, a pressure sensor is normally referred to as a "micro-pressure sensor".

The pressure measuring principle of the silicon-semiconductor oscillatory pressure sensor is as follows: if the silicon substrate diaphragm is subjected to pressure whilst a forced oscillation at a prescribed frequency is applied to the oscillator embedded in the diaphragm, then the oscillator incorporated is affected such that its resonant frequency is altered. This change in resonant frequency is put to use in the present invention. Because a specific relationship exists between the quantum of the change in the resonant frequency and the applied pressure, the pressure can be determined by measuring the change in the resonant frequency.

In order to apply a forced oscillation to said H-shaped oscillator, a current-conducting lead-in wire is formed in the silicon substrate and capsule by means of the planar technique, and a permanent magnet is installed outside of the oscillator to apply a magnetic field to the oscillator. An alternating current is passed through said lead-in wire to generate an alternating electromagnetic force as the current passes through said magnetic field, thereby subjecting the oscillator to a forced oscillation by the action of the alternating electromagnetic force.

OBJECT OF THE INVENTION

The oscillatory pressure sensor has a serious disadvantage in that silicon has the property that it is corroded by corrosive gases. A diaphragm made of a silicon substrate cannot therefore be exposed directly to corrosive gases. Hence, the gases to which the diaphragm can be exposed are limited to non-corrosive gases.

This means that some consideration is needed when the oscillatory pressure sensor is to be used to measure the pressure of corrosive gases. That is, it is necessary to employ a structure in which the oscillatory pressure sensor is installed within a silicon oil-filled casing, and a stainless steel diaphragm is hermetically placed in an opening to the casing to contact the corrosive gases. Since stainless-steel is corrosion-resistant, the diaphragm is flexed when subjected to the pressure of the corrosive gases, and the pressure is transmitted to the silicon oil. The hydraulic pressure of silicon oil is detected by the oscillatory pressure sensor. In other words, in this method the gas pressure is detected indirectly as the oil pressure.

However, detecting the gas pressure indirectly has a disadvantage in that the pressure is dispersed and dissipated when the gas pressure is converted to oil pressure, thus greatly reducing the sensitivity and accuracy of the sensor. Furthermore, since silicon oil is used, there is a high risk of the oil being ignited when a high temperature gas is detected. This means that the method has some practical limitations with regard to heat resistance.

Another shortcoming of the method is that sensitivity of the oscillator to the outer force for oscillating the oscillator is somewhat reduced because the oscillator is embedded in the silicon substrate. This is because the oscillator is closely adhered to the silicon substrate. It can be said that the smaller are the joints between the oscillator and the silicon substrate, the greater the sensitivity.

In addition, the oscillator of the oscillatory pressure sensor tends to generate electrical noise because it is forcibly oscillated by the electromagnetic force. That is, the lead-in wire running through the silicon substrate to the oscillator tends to subject the oscillator to external induction. This causes errors in the oscillation frequency of the forced oscillation. Further, the electrical noise causes errors in the detection of changes in the resonant frequency owing to the gas pressure.

It is a primary object of the present invention to provide an oscillatory pressure sensor having high sensitivity and accuracy by eliminating the aforementioned problems that are associated with the known oscillatory pressure sensor; wherein the accuracy of measurement is improved by employing a new structure permitting the pressure of corrosive gases to be applied directly to the diaphragm to which the oscillator is attached; good heat resistance is obtained by employing a structure in which silicon oil is not used; and furthermore, electrical noise is prevented by eliminating the electric circuit for the oscillator.

DISCLOSURE OF THE INVENTION

To achieve the above-stated object, the present invention, in one embodiment has a novel construction in which there is provided a stainless steel pressure-sensing diaphragm to a rear side surface of which the fluid pressure is applied, an oscillator being provided on a front side surface of the pressure sensing diaphragm. Having a stainless steel, highly corrosion-resistant diaphragm, the pressure sensor can be used to measure the pressure of corrosive gases.

Furthermore, since the pressure sensor is provided with a wall body that surrounds the oscillator, and a light transmitting part that closes an opening part of the wall body in an air-tight manner, such that an inner space, in which the oscillator is placed, forms a vacuum chamber, the resonant frequency of the oscillator can be detected with great accuracy by means of a non-contact light beam passing through the light-transmitting part.

According to another embodiment of the invention, the oscillator has a bridge structure in which the oscillator comprises a pair of base supports placed symmetrically on a surface of the pressure sensing diaphragm, and an oscillatory plate bridging the base supports. This structure allows the oscillatory plate to resonate with ease since the oscillatory plate is coupled to the diaphragm by the base supports alone. As a result, the oscillatory plate responds to an external vibration force and resonates with great sensitivity, thereby improving the accuracy of the resonant frequency, and the accuracy of measurement of the fluid pressure.

According to a still further embodiment of the invention, the pressure sensor is constructed such that the oscillatory force is applied from outside of the vacuum chamber, wiring for the oscillator being unnecessary so that externally induced electromagnetic noise is avoided. Further, there is provided an optical measuring means which comprises a light transmitting part at a desired position, wherein a light beam is allowed to pass through the light transmitting part to enter the vacuum chamber for incidence upon the oscillatory plate, the light beam reflected by the resonating oscillatory plate being allowed to exit through the light transmitting part, wherein the resonant frequency of the oscillator is measured by detecting the reflected light beam. The measurement of the resonant frequency is effected by non-contact optical means, thereby making it possible to measure the resonant frequency with great precision.

According to yet another embodiment of the invention, the optical measuring means comprises an optical fibre for the incident light beam, an incidence lens for focussing the incident light beam on the surface of the oscillator, a reflection lens for converging the beam reflected by the oscillator, and an optical fibre for guiding the reflected beam, whereby both the incident light beam and the reflected beam are guided as desired. Further, since the beam is focussed on the oscillator by means of the incidence lens, the resonance of the oscillator is accurately converted into a directional oscillation (fluctuation) of the reflected beam. As a result, changes in intensity of the reflected beam incident upon the optical fibre for reflection are accurately obtained.

According to another embodiment of the invention, the optical measuring means comprises a laser-Doppler vibration meter that is adapted to receive the beam reflected by the oscillator. The resonance speed of the oscillator is therefore accurately detected by the laser-Doppler method, thereby accurately obtaining the resonance frequency from changes in the oscillation speed.

According to yet another embodiment of the invention, the optical measuring means comprises a half-split light receiving element for receiving the reflected beam, thereby making it possible to convert the directional oscillation of the reflected beam into an oscillation of a differential output of the half-split light receiving element, such that the resonant frequency can be easily and accurately determined by subjecting the oscillation of the differential output to high-speed Fourier transformation or the like.

According to a further embodiment of the invention, the pressure detector is constructed such that a piezo-electric actuator is attached to an outside surface of the pressure-sensing diaphragm, the wall body, or the light transmitting part, wherein oscillation of the piezo-electric actuator subjects the oscillator of the pressure-sensing diaphragm to a forced oscillation. As a result, circuit wiring can be eliminated from the pressure-sensing diaphragm and the oscillator, thereby avoiding electric noise.

According to a still further embodiment of the invention, an alternating current voltage is applied between an electrode arranged outside of the light transmitting part and the stainless steel pressure-sensing diaphragm, wherein said alternating current voltage is adapted to change the inductive charge that is induced electrostatically on the diaphragm and the electrode, thereby subjecting the diaphragm to a forced oscillation with the force of the static electricity. As a result, circuit wiring can be eliminated from the diaphragm and oscillator for accurately measuring the resonant frequency with electrical noise being excluded.

Further objects, features and advantages will become apparent from the Detailed Description of Embodiment of the Invention, when considered together with the attached drawings.

EXPLANATION OF REFERENCE CHARACTERS AND NUMERALS 1 designates an oscillatory pressure sensor
2 a frame body
4 a pressure-sensing diaphragm 6 a pressure sensing space
8 a wall body
10 a vacuum chamber
12 an oscillator
14 a base support
16 a oscillatory plate
18 a getter
20 a light transmitting part
22 an optical measuring means
24 an incident lens
26 a reflection lens
28 an incident optical fibre
30 an reflection optical fibre
32 a SiO$_2$ film
32a a reverse side SiO$_2$ film
34 an Au/Cr film
36 a photoresistive film
38 a removal area
40 a Ni film
50 a chamber
52 a simulated pressure sensor
54 a container
55 a piezo-electric actuator
56 a pressure chamber
57 a means for forced oscillation
58 an injection pipe
60 an insertion pipe
62 an O-ring
64 a glass window
66 a vacuum chamber
68 an exhaust pipe
70 a network analyser
72 a power amplifier
74 a laser-Doppler vibration meter
76 an electrode part
78 a power amplifier
80 a laser beam source
82 a laser beam
84 a half-split photo-diode
E a direct current power source
$f_o$ resonance frequency
$\Delta f$ an amount of change of resonance frequency
$f_n$ resonance frequency
h a thickness
H a thickness
L a length
P a fluid pressure (applied pressure)
$P_b$ a base pressure, and
r a radius

DETAILED DESCRIPTION OF EMBODIMENTS OF THE INVENTION

The following embodiments of an oscillatory pressure sensor are described in detail with reference to the attached drawings hereunder.

Figure 1:
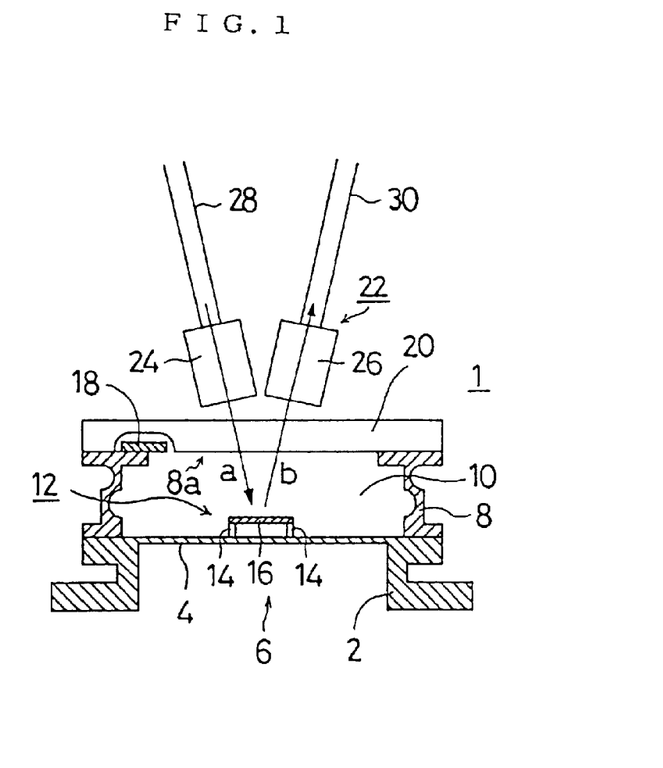
FIG. 1 is a longitudinal sectional view of an oscillatory pressure sensor according to an embodiment of the present invention.

FIG. 1 is a longitudinal sectional view of an oscillatory pressure sensor illustrating an embodiment of the present invention. The oscillatory pressure sensor 1 comprises an ring-shaped frame body 2 having a pressure sensing space 6 therein that is adapted to receive an inflowing fluid such a gas, a pressure-sensing diaphragm 4 formed on an upper surface of the frame body 2 such that the pressure of the fluid is directly applied to the diaphragm 4, a further ring-shaped wall body 8 installed on an upper surface of diaphragm 4, and a light transmitting part 20 that closes an upper opening of the wall body 8 in an air-tight manner.

The frame body 2 and the pressure-sensing diaphragm 4 are made of a highly corrosion-resistant stainless-steel, such, for example, as SUS316L having regard to the instances in which they come into contact with corrosive fluids. A space defined by the pressure-sensing diaphragm 4, the wall body 8 and the light transmitting part 20 is evacuated to form a vacuum chamber 10.

On a surface of the pressure-sensing diaphragm 4 facing the inside of the vacuum chamber 10, there is provided an oscillator 12 comprising a symmetrically placed pair of base supports 14, 14 formed on the pressure sensing diaphragm 4 and an oscillatory plate 16 bridging the base supports 14, 14.

The base supports 14, 14 are preferably made of an insulator such as SiO$_2$ or the like to exclude noise-generating external induction. The oscillating plate 16 is made of highly resonant metal materials which permit the plate 16 to respond easily to an oscillation-generating external force that is applied from outside of the vacuum chamber. Furthermore, the oscillating plate 16 is supported only by the base supports 14, 14 at both ends, thus rendering the oscillating plate 16 highly sensitive and resonant.

In the embodiment, the wall body 8 is made of a Ni alloy having Fe-42%. However, any other materials could be used instead. The light transmitting part 20 is made of a light transmitting material, such as highly heat-resistant Pyrex glass, for admitting an external incident light beam. Furthermore, the vacuum chamber 10 is provided with a getter 18 therein for maintaining the vacuum chamber under an high vacuum by its absorptivity. A nonevaporable getter (NEG) is preferred for the getter 18, and more particularly Fe—V—Zr type materials can be used.

Above the light transmitting part 20, there is installed an optical measuring means 22. There are various types of optical measuring means 22 that can be used. The present embodiment comprises an incident optical fibre 28 for guiding a laser beam as desired, an incident lens 24 to allow the laser beam to be focussed on a surface of the oscillatory plate 16, a reflection lens 26 for collecting the beam reflected by the resonating oscillatory plate 16, and a reflection optical fibre 30 to guide the collected reflected beam as desired. The reflected beam guided by means of the reflection optical fibre 30 is connected to an analyser (not shown) so that the fluid pressure applied to the pressure-sensing diaphragm 4 can be detected by measuring the resonant frequency.

Figure 2:
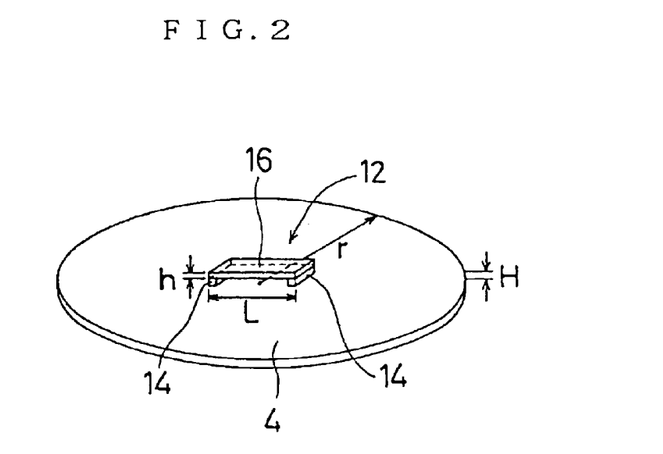
FIG. 2 is a perspective view showing a structure for assembling a pressure sensing diaphragm and an oscillator.

FIG. 2 is a perspective view showing a structure for assembling the pressure-sensing diaphragm and oscillator. The pressure-sensing diaphragm is formed in the shape of a circular disk plate. In the centre of the upper surface of the diaphragm there is provided said oscillatory plate 16 of which both ends are supported by the base supports 14, 14. Thus, the oscillator comprising the base supports 14, 14 and oscillatory plate 16 is formed in a bridge body structure.

The resonant frequency $f_n$ of an oscillator 12 having the form of a bridge body structure is theoretically obtained by the following equation:

$$f_n = [b/(2\pi)](E/\rho)^{1/2}(h/L^2)[1 + \gamma(L/h)^2(\epsilon_o + \epsilon_p)]^{1/2}$$

where:
b and $\gamma$ are each eigenvalues in the resonant mode,
E, $\sigma$, h, and L are respectively the Young's modulus, density, thickness, and length of the bridge body, and
$\epsilon_o$ and $\epsilon_p$ are respectively the initial distortion and the applied distortion of the bridge body.

When an appropriate fluid pressure P is applied to the pressure-sensing diaphragm 4, an applied distortion $\epsilon_p$ of the bridge body caused by the application of the fluid pressure P is theoretically given by the following equation:

$$\epsilon_p=3P(1-v^2)\{1-[L/(2r)]^2\}\times r^2/(8EH^2)$$

where:

v and E are respectively the Poisson ratio and Young's modulus of the pressure sensing diaphragm 4, and r and H are respectively the radius and thickness of the pressure-sensing diaphragm 4.

As shown above, the resonant frequency $f_n$ of the bridge body oscillator 12 illustrated in FIG. 2 is theoretically calculated from the fluid pressure P. Thus, the applied distortion $\epsilon_p$ is calculated from the fluid pressure P, and the resonance frequency $f_n$ is derived from the applied distortion $\epsilon_p$. However, the initial distortion $\epsilon_o$ is obtained by actual measurement. It should be noted, though, that this resonant frequency $f_n$ is a theoretical value, and indicates only a roughly estimated value of the true resonant frequency. In the embodiment, a method is employed in which the actual resonant frequency $f_n$ is measured directly, with the directional oscillation, intensity oscillation, frequency oscillation, and the like, of the reflected beam being subjected to Fourier transformation.

Figure 3:
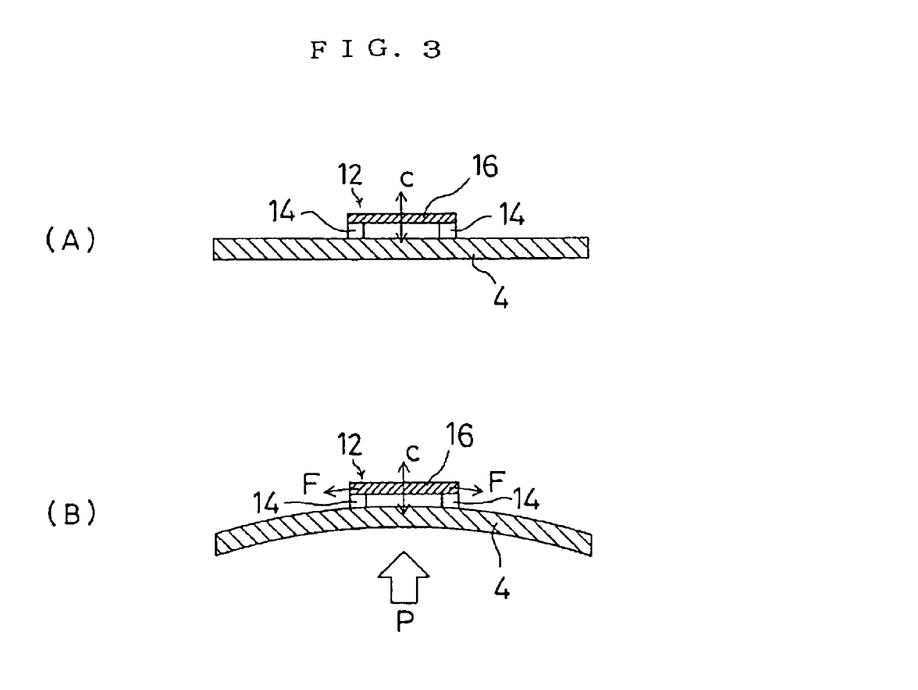
FIG. 3 is a view illustrating the resonance of an oscillating plate.

FIG. 3 is a view illustrating the resonance of the oscillatory plate. As stated above, the oscillator 12 is formed in a bridge structure in such a manner that the oscillatory plate 16 is provided on the pressure-sensing diaphragm 4 via the base supports 14, 14. As shown in FIG. 3(A), when an external vibration force is applied to the oscillator 12, the oscillatory plate 16 resonates with the resonant frequency fo in the direction of the arrow c.

Next, as shown in FIG. 3(B), when the fluid pressure P is directly applied on the reverse side of the pressure-sensing diaphragm 4, the diaphragm 4 is deflected upwards, and the oscillatory plate 16 is distorted, subject to a tensile force F working to pull in the right and left directions. The distortion of the oscillatory plate 16 acts to shift the resonant frequency from $f_o$ to $f_o+\Delta f$. $f_o+\Delta f$ is the resonant frequency $f_n$ to be measured.

Figure 4:
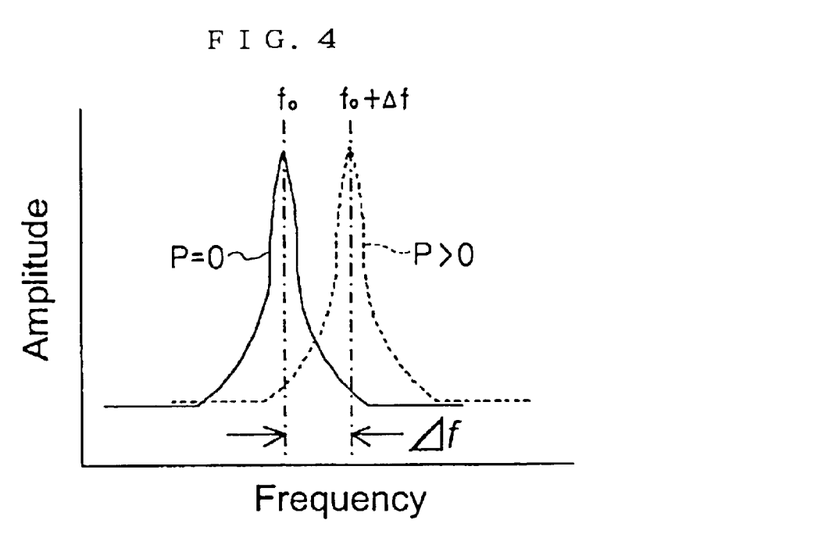
FIG. 4 shows changes in the resonant frequency of an oscillatory plate caused by fluid pressure.

FIG. 4 shows changes in the resonant frequency of the oscillatory plate caused by the fluid pressure. The abscissa axis represents frequency, and the ordinate axis represents intensity of resonance. When the fluid pressure P is zero, the resonant frequency=fo. It is shown that when a fluid pressure P (>0) is applied, the resonant frequency is increased to $f_o+\Delta f$=fn. The fluid pressure P can be derived from the resonant frequency fn. The sharper is the resonance peak, the greater the resonance performance. According to the present invention, the oscillator has a bridge structure. The oscillatory plate 16 therefore is extremely responsive to the external force. This means that the resonance peak is extremely sharp and pointed.

Figure 5:
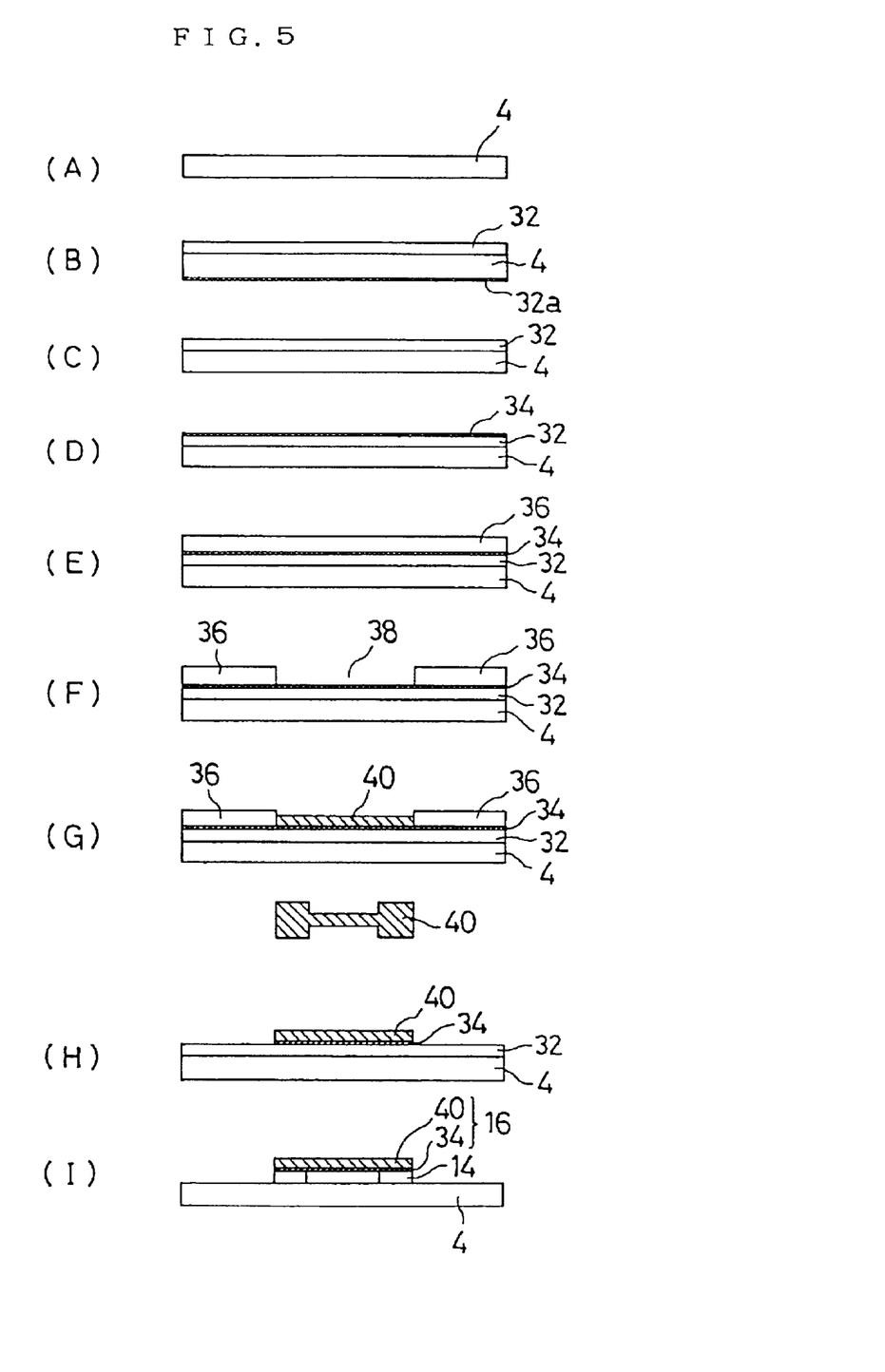
FIG. 5 shows a process for manufacturing an oscillator having a bridge structure according to the present invention.

FIG. 5 shows a process for manufacturing an oscillator having a bridge structure according to the present invention. Referring to FIG. 5(A), a circular disk-shaped pressure sensing diaphragm 4 of SUS316L stainless-steel is provided. Referring to FIG. 5(B), a 5 μm thick $SiO_2$ film 32 and a rear-side $SiO_2$ film 32a are formed respectively on top and rear surfaces of the pressure sensing diaphragm 4 by means of the TESO-PLASMA-CVD method (Tetra-Ethoxy-Silicon Plasma Chemical Vapor Deposition).

As shown in FIG. 5(C) the rear-side $SiO_2$ film 32a formed on the rear side of the pressure sensing diaphragm 4 by means of the TESO-PLASMA-CVD method is removed thoroughly by etching with a $CF_4$ plasma.

Referring to FIG. 5(D), a 30 nm/10 nm thick Au/Cr film 34 is laminated onto the surface of $SiO_2$ film 32 by electron-beam vapor deposition. Referring to FIG. 5(E), a photo-resistive film 36, which is a positive resistive PMER P-AR900 (Tokyo Ohka Kogyo K.K.-made positive type photo-resistive for high precision thick film plating), is applied onto the surface of the Au/Cr film 34.

Referring to FIG. 5(F), ultra violet light is irradiated onto predetermined parts of the photo-resistive film 36 through a photo-mask in order to remove the photo-resist in the irradiated area by means of development treatment, thus forming removal areas 38 on the photo-resistive film 36

Referring to FIG. 5(G), a Ni film 40 is formed on the removal areas 38 by means of Ni electrolytic plating. Ni electrolytic plating liquid is obtained by dissolving 96g of nickel sulfate, 18 g of nickel chloride, and 12 g of boric acid in 400 mL of DI (deionised) water. The plating conditions are as follows:

bath temperature: 60° C.
current value: 5 mA, and
duty cycle: 10 m sec.

The Ni film 40 is formed in the shape of an I.

Referring to FIG. 5(H), the photo-resistive film 36 is thoroughly removed by positive resist peeling liquid. At the same time, the Au/Cr film 34 disposed beneath the photo-resistive film 36 is also removed by a wet etching liquid.

Referring to FIG. 5(I), the $SiO_2$ film 32 is etched with fluoric acid (buffered HF). The $SiO_2$ film 32 disposed beneath the Ni film 40 is also etched with fluoric acid, and part of the $SiO_2$ film 40 is left to form the base supporters 14, 14.

Lastly, cleansing is performed with DI water. To prevent sticking between the resulting bridge-structured Ni oscillator and the stainless-steel diaphragm 4 that is disposed underneath, cleansing is performed while the DI water is replaced by methanol, ethyl ether and Fluorinert® successively, in that order. Finally, the oscillator is dried together with Fluorinert® at a temperature of 145° C. in a bake furnace.

Figure 6:
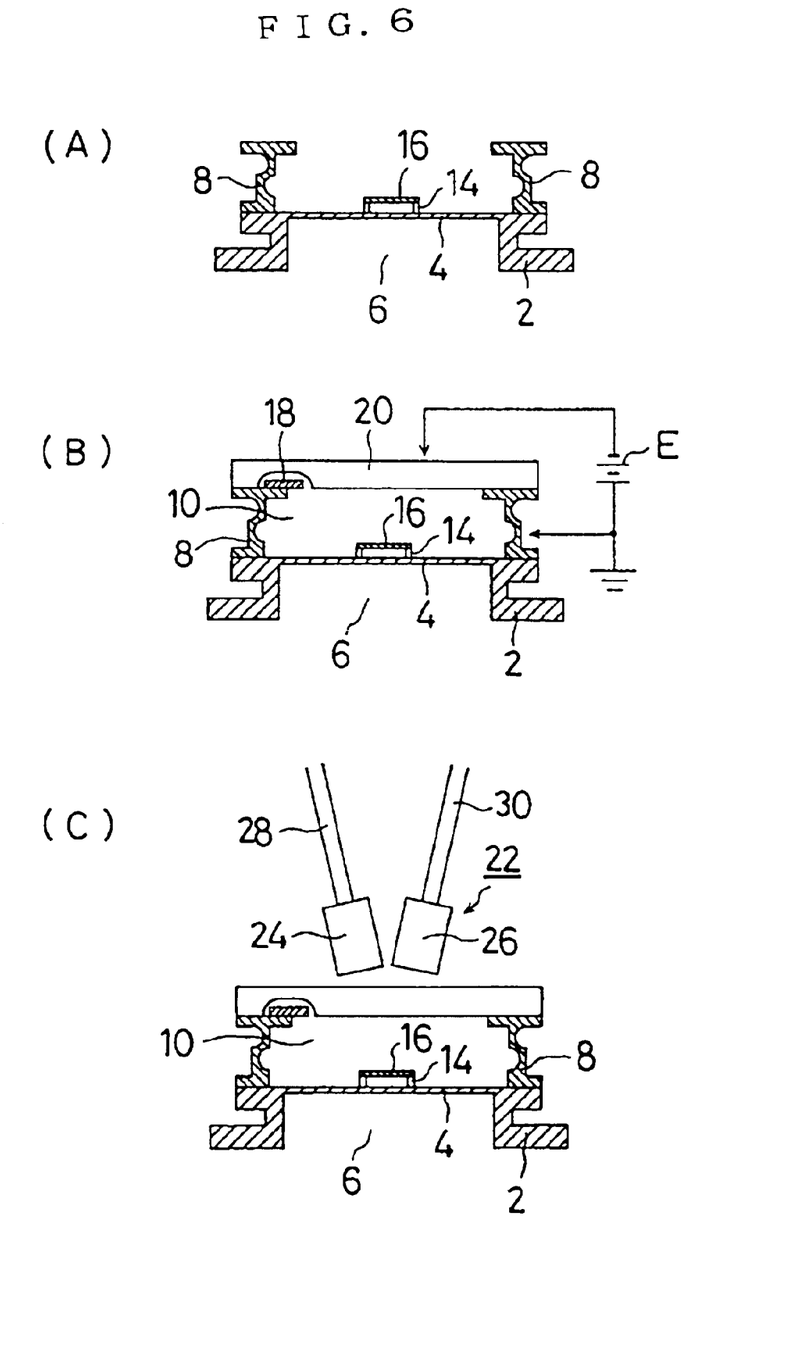
FIG. 6 shows a process for assembling an oscillatory pressure sensor according to the present invention.

FIG. 6 shows a process for assembling an oscillatory pressure sensor according to the present invention. Referring to FIG. 6(A), a cut-out Fe-42% Ni ring-shaped wall body 8 is placed on a stainless-steel frame body 2 and joined thereto by laser welding.

Referring to FIG. 6(B), a Pyrex glass, circular light-transmitting part 20 is placed on the wail body 8, and an opening part 8a is closed in an air-tight manner by anodic welding using a direct current source E. The closing operation is carried out under vacuum, and a non-evaporable getter (NEG) 18 is installed in the sealed interior. A vacuum chamber 10 is formed easily because sealing is carried out under vacuum.

Referring to FIG. 6(C), an optical measuring means 22 is fitted externally, above the light-transmitting part 20. The optical measuring means 22 comprises an incident optical fibre 28, an incident lens 24, a reflection lens 26, and a reflection optical fibre 30.

Figure 7:
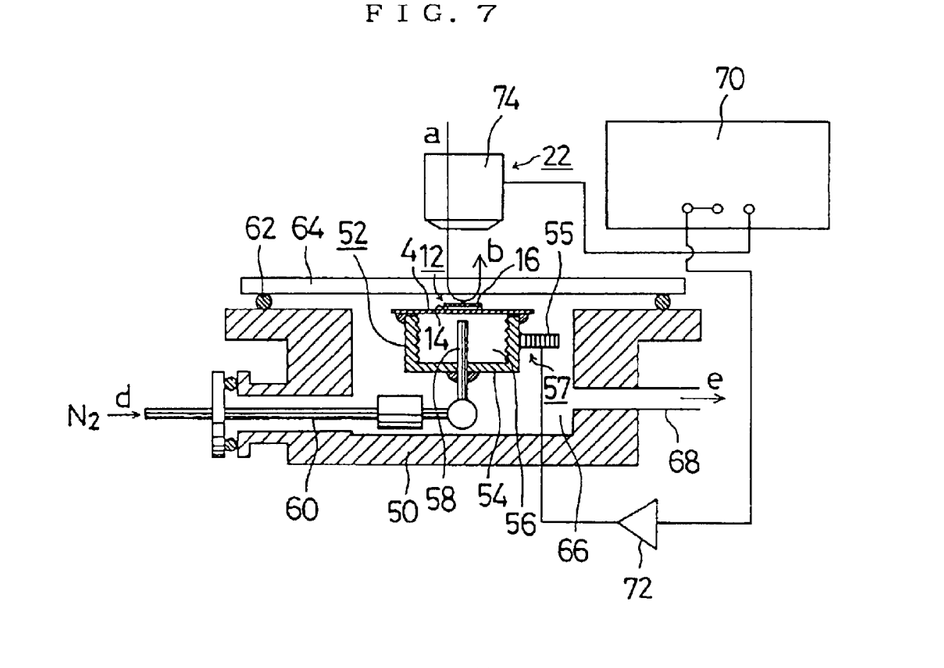
FIG. 7 is a view illustrating measurement of the performance of a bridge-type oscillator driven by a piezo-electric actuator.

FIG. 7 is a view illustrating the measurement of the performance of a bridge-type oscillator when driven by a piezo-electric actuator. A vacuum chamber 66 corresponding to the aforementioned vacuum chamber 10 is formed in a chamber 50. The vacuum within said vacuum chamber 66 is set at an appropriate level by exhausting air through an exhaust pipe 68 in the direction of arrow e by means of a dry pump (not illustrated). The pressure within the vacuum chamber 66 is designated the base pressure $P_b$.

A simulated pressure sensor 52 is arranged within the vacuum chamber 66. The simulated pressure sensor 52 has the following construction. An upper side of a container 54 is hermetically sealed by a pressure sensing diaphragm 4, while a bridge-type oscillator 12 is provided on the diaphragm 4 such that both ends of an oscillating plate 16 are supported by base supporters 14, 14.

An inner space of the container 54 constitutes a pressure chamber 56. $N_2$ gas is supplied in the direction of arrow d, through an injection pipe 58 and an insertion pipe 60, and the pressure is adjusted to a required pressure with $N_2$ gas. Hence, the pressure chamber 56 corresponds to the aforementioned pressure sensing space 6 in which fluid is allowed to flow. The pressure within the pressure chamber 56 is designated the applied pressure P.

A piezo-electric actuator 55 is fitted on an outer periphery of the container 54 as a means 57 for forced oscillation, and is voltage-driven by a network analyser 70 through a power amplifier 72, thereby oscillating the piezo-electric actuator 57. The oscillating plate 16 is thus caused to resonate by this external oscillation force.

An upper surface of the chamber 50 is sealed in an air-tight manner by a glass window 64 via an O-ring 62. The glass window 64 corresponds to the light transmitting part 20. A laser-Doppler vibration meter 74 is installed above the glass window 64 and is controlled by said network analyser 70. The laser-Doppler vibration meter 74 is installed as an optical measuring means.

When a laser beam with a specific frequency is emitted for incidence from the laser-Doppler vibration meter 74 in the direction of arrow a, the laser beam passes through the glass window 64, and is reflected by a surface of the oscillating plate 16. The beam reflected in the direction of arrow b returns through the glass window 64 and enters into and is incident upon the laser-Doppler vibration meter 74.

Said oscillating plate 16 is allowed to vibrate in a vertical direction (up and down vibration). The photo-Doppler effect caused by this vibration causes the frequency of the reflected beam to change. From the frequency change, the resonant frequency of the oscillating plate can be measured. The resonant frequency can be derived either by an inner circuit of the laser-Doppler vibration meter 74, or using the network analyser 70.

Figure 8:
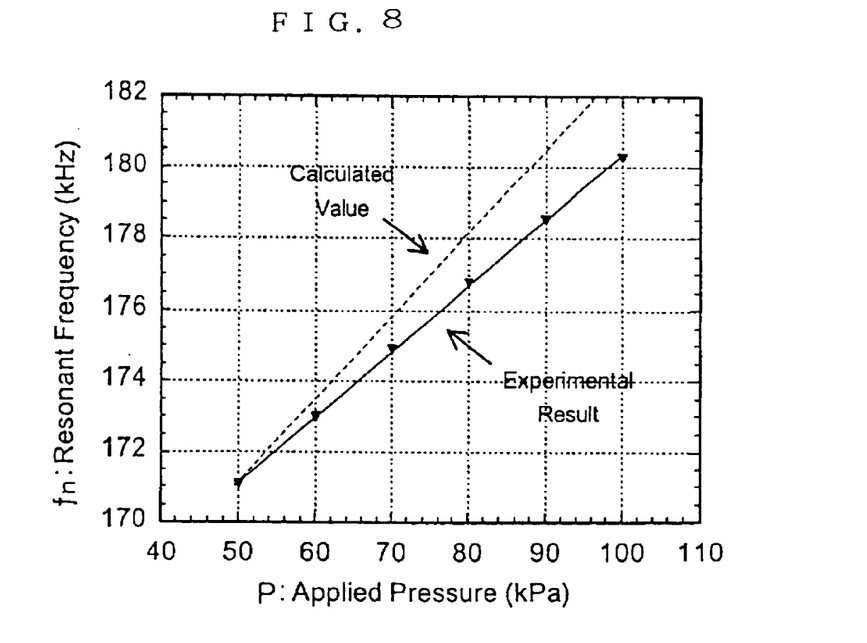
FIG. 8 is an illustration showing the relationship between the resonant frequency $f_n$ of an oscillatory plate and the applied pressure P.

FIG. 8 is an illustration showing the relationship between the resonant frequency $f_n$ and the applied pressure P. Said applied pressure P is regulated as desired by the volume of $N_2$ gas supplied in the range of 50~100 (kPa). It was found that the resonant frequency $f_n$ changes linearly in the range of 171~180.5 (kHz).

Since the resonant frequency $f_n$ and the applied pressure P demonstrate extremely high linear properties, it is quite easy to derive the applied pressure P from the resonant frequency $f_n$. Advantageously no special electronic circuitry is required.

That is to say, the present invention has a construction in which the oscillator is completely separated from the outside, so that the oscillator is unaffected by external noises. Furthermore, the oscillator is allowed to resonate in a non-contact state. Also, the resonance is detected optically, where the optical measuring means does not come into contact with the oscillator. As a result, the oscillator is unaffected by a disturbance in any part of the process. This construction, which excludes disturbances, ensures a high proficiency of the oscillatory pressure sensor according to the present invention.

The broken line in FIG. 8 shows the relationship between the resonant frequency $f_n$ and the applied pressure P using the aforementioned theoretical formula. As shown, although the broken line is also extremely linear, the gradient of the broken line is somewhat different from that of the line based on the experiment. It is understandable that there is a slight difference between the two lines in respect of the gradient owing to differences between experimental and theoretical conditions. However, it is assumed that the high linearity of the experiment is attributable to the structural simplicity of the oscillatory pressure sensor and its excellent noise-excluding capabilities.

Figure 9:
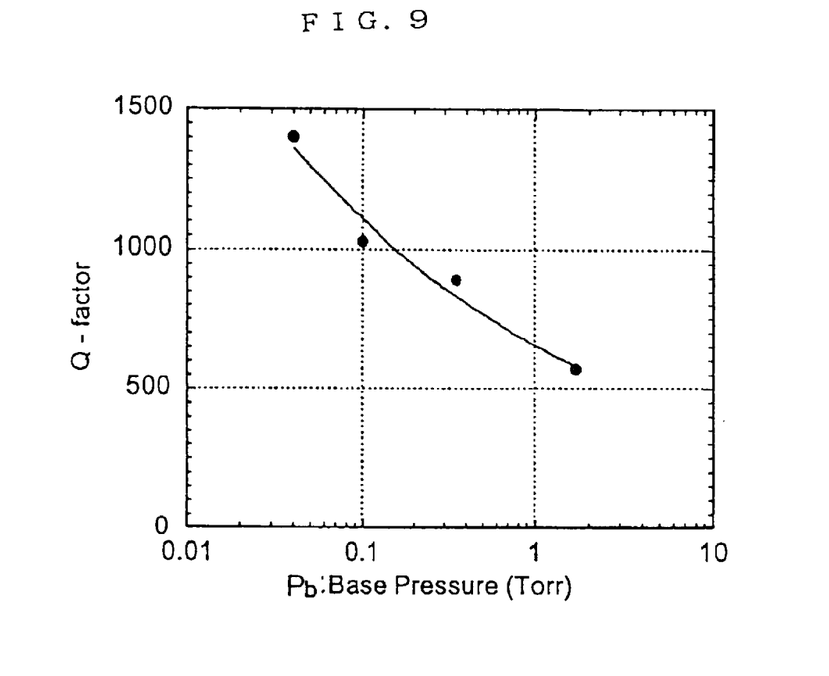
FIG. 9 is an illustration showing the relationship between the base pressure $P_b$ in a vacuum chamber and a factor Q.

FIG. 9 is an illustration showing the relationship between the base pressure $P_b$ and a factor Q in the vacuum chamber 66. It is desirable that the vacuum chamber 66 should be kept under a perfect vacuum. However, impure gases are unavoidably introduced in the experiment. Hence, this degree of vacuum is expressed by the base pressure $P_b$.

The smaller the base pressure $P_b$ becomes, the larger the factor Q becomes. The larger factor Q indicates a higher resonance performance. It is found, therefore, that the higher the base pressure $P_b$ is, the better the resonance capability of the oscillator.

The reason can be explained by the squeezed-film effect. The squeezed-film effect is that a great viscosity resistance arises when a fluid that is held in a small volume is expelled. That is, when the base pressure $P_b$ is reduced, the mean free path of a molecule is increased, and the coefficient of viscosity becomes smaller, making it harder for the amplitude of the bridge structured oscillatory plate 16 to be attenuated. As a result, the value of the factor Q is increased.

In the oscillatory pressure sensor according to the present invention, the oscillator is installed inside a vacuum chamber. The resonance capability is therefore kept extremely high. It is important that the vacuum level in the vacuum chamber is set as high as possible. High resonance characteristics of the oscillatory pressure sensor according to the present invention are well verified in FIGS. 8 and 9.

Figure 10:
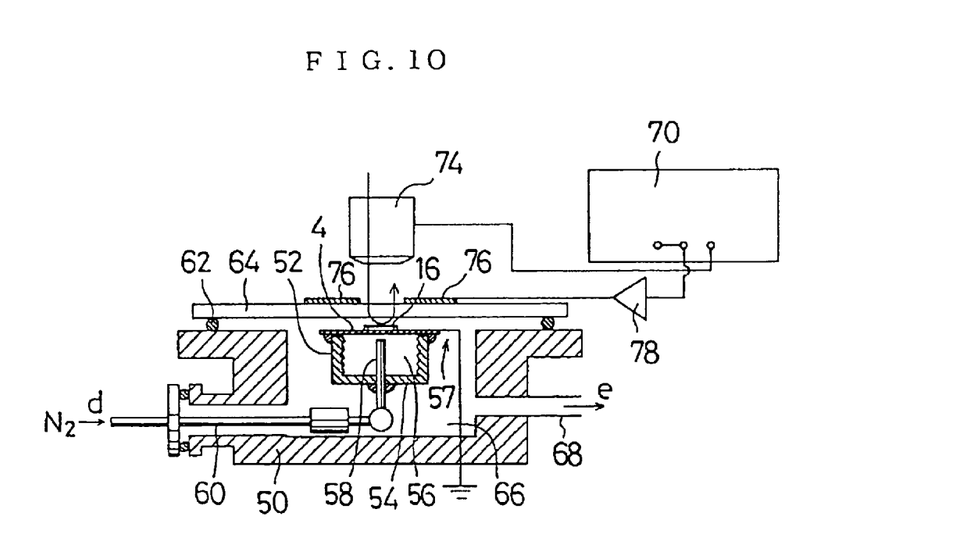
FIG. 10 is a view illustrating measurement of the performance of an oscillatory pressure sensor driven by an electrostatic drive.

FIG. 10 is a view illustrating measurement of the performance of an oscillatory pressure sensor when driven by electrostatic actuation. Alternating current electrostatic induction is used in this method as a forced oscillation means 57. The stainless-steel pressure sensing diaphragm 4 is connected to earth. Then, an alternating current is applied between earth and an electrode part 76 that is placed on a surface of a glass window 64. A copper foil, for example, can be used as the electrode part 76.

Figure 11:
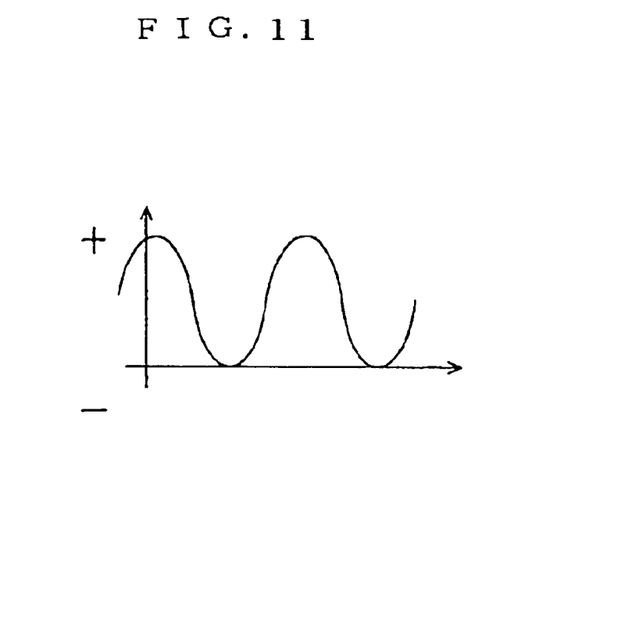
FIG. 11 is a waveform graph of an example of an alternating current voltage for use in said electrostatic drive.

An alternating current voltage is applied to the electrode part 76 through a power amplifier 78 from a network analyser 70. FIG. 11 is a waveform graph of an exemplary alternating current voltage used for the electrostatic drive. Upon application of the alternating current voltage, positive and negative values of the inductive charge that is induced electrostatically on the electrode part 76 are alternated. Electrostatic attraction and mechanical restoring force work alternately between the electrode part 76 and the pressure sensing diaphragm 14. The phenomenon is referred to herein as alternating current electrostatic induction according to the present invention. As a result, the oscillatory plate 16 is indirectly subjected to forced oscillation, and thereby enters the resonant state.

The base supporters 14, 14 are made of $SiO_2$ having insulating properties. Accordingly, no electric charge is electrostatically induced on the oscillatory plate 16, even if the oscillatory plate 16 is made of Ni metals. However, if the base supporters 14, 14 are made of conductive materials such as Ni or the like, then electrostatic induction is caused on the oscillatory plate 16 itself, and alternating current electrostatic induction occurs between the electrode part 76 and the oscillating plate 16, thereby causing the forced oscillation.

In order to subject the oscillatory plate 16 to forced oscillation, the base supporters 14, 14 can be made of conducting materials or materials having insulating properties. However, where materials having insulating properties such as $SiO_2$ and the like are used, the oscillating plate 16 is not subjected to induction by electromagnetic waves existing in the outer space, with the result that no noise signals are introduced to the oscillatory plate 16. In this regard, base supporters 14, 14 with insulating properties are preferred over those with electrical conducting properties.

The construction of the device shown in FIG. 10 is identical to that of the one in FIG. 7 except that the forced oscillation means 57 of the former is an electrostatic drive. Accordingly, explanation is omitted here for the identical parts.

Figure 12:
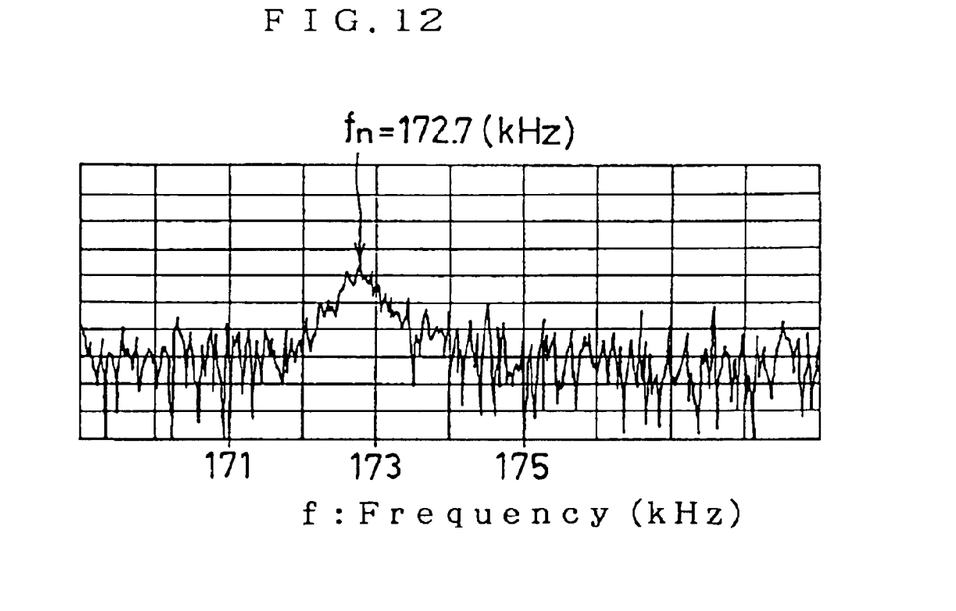
FIG. 12 is an illustration of an example of the frequency characteristics of an oscillating plate actuated by the electrostatic drive.

FIG. 12 is an illustration of an example of the frequency characteristics of the oscillatory plate under electrostatic drive. The reflected beam is inputted to the laser-Doppler vibration meter 74, and the signals are subjected to high-speed Fourier transformation and converted to a power spectrum. The curves in the drawing correspond to the power spectrum. The peak frequency of the power spectrum is 172.7 kHz. The peak frequency corresponds to the resonant frequency. The fluid pressure P can be derived from the peak frequency.

Figure 13:
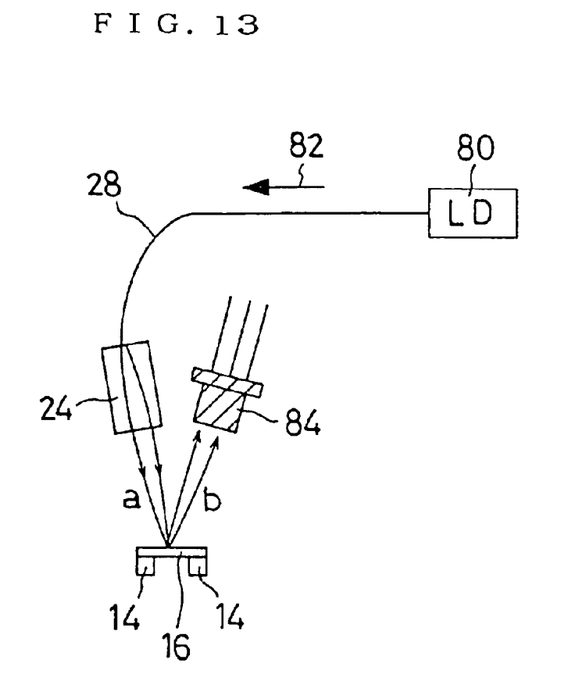
FIG. 13 is a view illustrating an optical measuring means in which a half-split beam receiving element is used.

FIG. 13 is a view illustrating optical measuring means employing an half-split light-receiving element. It is known that an half-split light-receiving element includes an half-split photo-diode, an half-split photo-transistor or the like. An half-split photo-diode is chosen here for the purpose of explanation.

A laser beam 82 is emitted from a laser light source 80 in the direction of the arrows. While the laser beam is guided as desired by means of the incident optical fibre 28, the laser beam is directed from the incidence lens 24 to impinge incidentally upon the oscillatory plate 16 in the direction of arrows a. With the oscillatory plate resonating, the beam is reflected in the direction of arrows b, while the direction of reflection oscillates.

The half-split photo-diode 84 comprises two photo-diodes arranged side by side.

The two diodes are so constructed that the two diodes receive the reflected beam in identical intensity when the oscillatory plate 16 is resonating with no pressure being applied.

Since the direction of reflection of the reflected beam oscillates when the oscillatory plate 16 oscillates, the amount of light received by each of the two photo-diodes changes. The difference in the amount of light received is inputted to the aforementioned network analyser 70. A differential output oscillates at a frequency identical to the resonant frequency of the oscillatory plate 16. The resonant frequency can therefore be measured by analysing the frequency by high-speed Fourier transformation with the network analyser 70.

Figure 14:
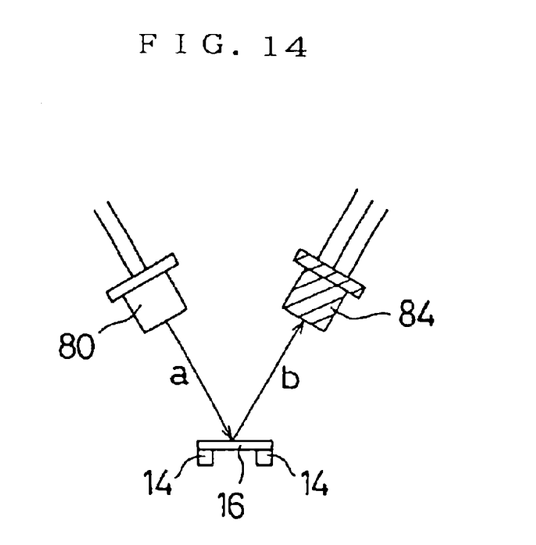
FIG. 14 is a view illustrating a modification to the optical measuring means which employs a half-split beam receiving element.

FIG. 14 is a view illustrating a modification of the optical measuring means which employs a half-split light-receiving element. According to the modification, neither the incident optical fibre, nor the incident lens is used, but the laser beam is applied directly to the oscillatory plate 16 for incidence from the laser beam source 80, such as a laser diode or the like, through the light transmitting part 20. A detailed explanation is omitted because this method has the same effect as that shown in FIG. 13.

Of course, the light-emitting element, such as the laser beam source or the like, and the light-receiving element, such as the half-split light-receiving element or the like, may be integrated.

As described above, the method in which an optical fibre and a lens are combined, the method in which a laser-Doppler vibration meter is employed, and the method in which a half-split light-receiving element is used are given as examples of the optical measuring means 22 of the present invention. Of course, other methods that are available to the public could be employed instead. Further, a piezo-electric actuator drive method and an alternating current electrostatic drive method are employed as means for forcing oscillation of the oscillator, but of course, other methods that are available to the public could be used instead to provide an external oscillatory force.

The present invention is not limited to the foregoing embodiments. It will be appreciated that various modifications and changes in design, without departing from the technical concept of the present invention, may be included within the technical scope of the present invention.

Effects of the Invention

According to one embodiment the present invention, the pressurised fluid is received by a stainless-steel pressure sensing diaphragm. Accordingly, high durability is ensured even when it is used for measuring the pressure of a corrosive fluid. Furthermore, a wall body that surrounds the oscillator, and a light transmitting part which closes an opening part of the wall body in an air-tight manner are provided to render an inner space in which the oscillator is installed as a vacuum chamber. As a result, the invention can detect with great accuracy the resonant frequency of the oscillator in a non-contact manner by means of a light beam passing through the light transmitting part. In addition, since the oscillatory plate is placed under vacuum, it is difficult for the amplitude of the oscillating plate to be attenuated, thus enabling the oscillatory plate to resonate with great sensitivity.

According to a further embodiment of the present invention, the oscillator has a bridge structure in which a pair of symmetrically installed base supports is bridged by the oscillatory plate. This structure makes it easy for the oscillatory plate to resonate, and to resonate with great sensitivity in response to an external vibratory force. As a result, the accuracy of measurement of the resonant frequency is improved, thereby improving the accuracy of fluid pressure measurement.

According to a still further embodiment of the present invention, since the pressure sensor is formed such that the external oscillatory force is applied from outside of the vacuum chamber, wiring for the oscillator is unnecessary, so that the introduction of electromagnetic induction noise present in the external space is avoided. Furthermore, it is also formed such that the incidence and reflection of a light beam are effected through the light transmitting part without contacting the oscillator. This ensures that the oscillator is completely unaffected by any disturbances. Thus, accurate measurement of the resonant frequency can be achieved using non-contact optical means.

According to another embodiment of the present invention, the optical measuring means comprises an incident optical fibre for the light beam, an incident lens to cause the incident light beam to be focussed on a surface of the oscillator, a reflection lens for converging the beam reflected by the oscillator, and an optical fibre for guiding the reflected beam. As a result, the incident and reflected beams are guided as desired. Furthermore, since the beam is converged on the oscillator by means of the incident lens, resonance of the oscillator is converted accurately into a directional oscillation (fluctuations) of the reflected beam. As a result, changes in the light intensity of the reflected beam that is incident upon the optical fibre can be accurately obtained.

According to yet another embodiment of the present invention, the optical measuring means comprises a laser- Doppler vibration meter for receiving the reflected beam. The resonant frequency of the oscillator is therefore detected accurately by means of a laser-Doppler method, thus achieving fast and accurate measurement.

According to still another embodiment of the present invention, the optical measuring means comprises an half-split light-receiving element, thus making it possible to convert promptly the directional oscillation of the reflected beam into oscillation of a differential output of the half-split light-receiving element, such that the resonance frequency can be easily and accurately obtained by performing a frequency analysis, such as an high-speed Fourier transformation, with respect to the oscillation.

According to a further embodiment of the present invention, the pressure detector is so formed that an piezo-electric actuator is attached to an external surface of the pressure sensing diaphragm, wall body or light transmitting part, wherein oscillation of the piezo-electric actuator causes the oscillator of the pressure sensing diaphragm to be subjected to forced oscillation. Circuit wiring is therefore eliminated from the pressure sensing diaphragm and the oscillator such that the introduction of electric noises can be excluded.

According to a still further embodiment of the present invention, an alternating current voltage is applied between an electrode arranged outside of the light transmitting part and the stainless-steel pressure sensing diaphragm, wherein the alternating current voltage changes the inductive charge that is electrostatically induced on the diaphragm and electrode, thus subjecting the diaphragm to forced oscillation by the force of static electricity. Circuit wiring can therefore be eliminated from the diaphragm and oscillator, thus making it possible to exclude electrical noises in order to measure accurately the resonant frequency.

As explained above, the present invention achieves excellent, practical effects.

While the present invention has been described with reference to certain illustrative embodiments, one of ordinary skill in the art will recognize that additions, deletions, substitutions, and improvements can be made while remaning within the scope and spirit of the present invention as defined by the attached claims.

What is claimed is:

1. An oscillatory pressure sensor, comprising:
   a stainless-steel pressure sensing diaphragm to a rear side surface of which a fluid pressure is applied;
   an oscillator provided on a front side surface of the pressure sensing diaphragm;
   a wall body so arranged that it surrounds the oscillator; and
   a light transmitting part which closes an opening part of the wall body in an air-tight manner such that an inner space in which the oscillator is installed forms a vacuum chamber.

2. An oscillatory pressure sensor as claimed in claim 1, wherein said oscillator has a bridge structure in which the oscillator comprises a pair of base supports that are symmetrically placed on a surface of the pressure sensing diaphragm, and an oscillatory plate bridging the base supports.

3. An oscillatory pressure sensor as claimed in claim 1, having an optical measuring means in which an incident light beam is permitted to pass through the light transmitting part to enter the vacuum chamber, the light beam reflected by an oscillatory plate that is caused to resonate by an external vibratory force applied from outside of the vacuum chamber is allowed to exit the vacuum chamber through the light transmitting part, and the reflected light beam is detected to measure the resonant frequency of the oscillator so that the fluid pressure detected by the pressure sensing diaphragm is obtained from said resonant frequency.

4. An oscillatory pressure sensor as claimed in claim 3, wherein said optical measuring means comprises an optical fibre for incidence of the light beam, an incident lens causing the incident beam to be focussed upon the surface of the oscillator, a reflection lens for converging the beam reflected by the oscillator, and an optical fibre for reflection to guide the reflected beam.

5. An oscillatory pressure sensor as claimed in claim 3, wherein said optical measuring means comprises a laser-Doppler vibration meter to receive the beam reflected by the oscillator.

6. An oscillatory pressure sensor as claimed in claim 3, wherein said optical measuring means comprises a half-split light-receiving element, wherein changes in the reflected beam are detected by a differential output of the half-split light-receiving element, so that the resonant frequency of the oscillator is obtained.

7. An oscillatory pressure sensor as claimed in claim 3, wherein a piezo-electric actuator is attached to an outer surface of said pressure sensing diaphragm, the wall body or light transmitting part, such that the oscillator of the pressure sensing diaphragm is caused to resonate with the oscillation of the piezo-electric actuator.

8. An oscillatory pressure sensor as claimed in claim 3, wherein an alternating current voltage is applied between an electrode part arranged externally of said light transmitting part and the stainless-steel pressure sensing diaphragm, and the static electric force subjects the diaphragm to a forced oscillation such that the oscillator is caused indirectly to resonate.

9. An oscillatory pressure sensor as claimed in claim 1, having an optical measuring device, arranged so that an incident light beam is permitted to pass through the light transmitting part to enter the vacuum chamber, the light beam being reflected by an oscillatory plate that is caused to resonate by an external vibratory force applied from outside of the vacuum chamber, and allowed to exit the vacuum chamber through the light transmitting part, and the reflected light beam being detected to measure the resonant frequency of the oscillator so that the fluid pressure detected by the pressure sensing diaphragm is obtained from said resonant frequency.

10. An oscillatory pressure sensor as claimed in claim 9, wherein said optical measuring device comprises an optical fibre incidence of the light beam, an incident lens arranged to focus the incident beam upon a surface of the oscillator, a reflection lens arranged to converge the beam reflected by the oscillator, and an optical fibre arranged to guide the reflected beam.

11. An oscillatory pressure sensor as claimed in claim 9, wherein said optical measuring device comprises a laser-Doppler vibration meter to receive the beam reflected by the oscillator.

12. An oscillatory pressure sensor as claimed in claim 9, wherein said optical measuring device comprises a half-split light-receiving element, wherein changes in the reflected beam are detected by a differential output of the half-split light-receiving element, so that the resonant frequency of the oscillator is obtained.

13. An oscillatory pressure sensor as claimed in claim 9, wherein a piezo-electric actuator is attached to an outer surface of said pressure sensing diaphragm, the wall body or light transmitting part, such that the oscillator of the pressure sensing diaphragm is caused to resonate with the oscillation of the piezo-electric actuator.

14. An oscillatory pressure sensor as claimed in claim 9, wherein an alternating current voltage is applied between an electrode part arranged externally of said light transmitting part and the stainless-steel pressure sensing diaphragm, and the static electric force subjects the diaphragm to a forced oscillation such that the oscillator is caused indirectly to resonate.

* * * * *